US009393588B2

(12) United States Patent
Vlachos et al.

(10) Patent No.: US 9,393,588 B2
(45) Date of Patent: Jul. 19, 2016

(54) METHOD OF FORMING A LUBRICATING COATING ON A RAZOR BLADE, SUCH A RAZOR BLADE AND RAZOR BLADE COATING SYSTEM

(75) Inventors: Giorgos Vlachos, Athens (GR); Vassilis Papachristos, Athens (GR); Michalis Karoussis, Athens (GR)

(73) Assignee: BIC VIOLEX S.A., Anixi (GR)

( * ) Notice: Subject to any disclaimer, the term of this patent is extended or adjusted under 35 U.S.C. 154(b) by 252 days.

(21) Appl. No.: 13/503,279

(22) PCT Filed: Oct. 22, 2009

(86) PCT No.: PCT/EP2009/063936

§ 371 (c)(1), (2), (4) Date: Apr. 20, 2012

(87) PCT Pub. No.: WO2011/047727
PCT Pub. Date: Apr. 28, 2011

(65) Prior Publication Data

US 2012/0204429 A1 Aug. 16, 2012

(51) Int. Cl.
*B05D 1/12* (2006.01)
*B05B 7/08* (2006.01)
(Continued)

(52) U.S. Cl.

CPC ................ *B05D 1/12* (2013.01); *B05B 7/0815* (2013.01); *B05B 13/0221* (2013.01); *B05D 1/02* (2013.01); *B05D 3/042* (2013.01); *B26B 21/60* (2013.01); *F16N 7/34* (2013.01); *B05B 13/02* (2013.01); *B05B 15/045* (2013.01); *B05D 1/04* (2013.01); *B05D 3/0218* (2013.01);
(Continued)

(58) Field of Classification Search
None
See application file for complete search history.

(56) References Cited

U.S. PATENT DOCUMENTS 2,757,048 A * 7/1956 Balmer ......................... 239/306
3,283,117 A * 11/1966 Holmes et al. ............. 219/76.16
(Continued)

FOREIGN PATENT DOCUMENTS

FR 1 299 519 12/1960
JP 7-505802 6/1995
(Continued)

OTHER PUBLICATIONS

International Search Report (PCT/EP2009/063936).
(Continued)

*Primary Examiner* — Michael P Rodriguez
(74) *Attorney, Agent, or Firm* — Polsinelli

(57) ABSTRACT

A method of forming a lubricating coating on a razor blade that includes: providing a razor blade having a body and a cutting edge tapering from the body; providing a tank of a colloidal dispersion of a polymer having less than 2% in weight of polymer particles; providing a spray gun in fluid communication with the tank, the gun having an end directed to a blade-spraying region; placing the razor blade at a predetermined temperature (T) in the blade-spraying region; flowing the colloidal dispersion from the tank to the end of the spray gun, and in a direction to the razor blade; controlling a first gas stream to nebulise the colloidal dispersion into a mist in a dispersion region located between the end of the spray gun and the razor blade; independently controlling a second gas stream to control the mist properties; transporting the mist from the dispersion region to the razor blade placed in the blade-spraying region, the razor blade being at the predetermined temperature (T) so that water evaporates from the mist, and sintering the polymer.

17 Claims, 7 Drawing Sheets

(51) Int. Cl.
   *B05D 1/02*   (2006.01)
   *B05D 3/04*   (2006.01)
   *B26B 21/60*  (2006.01)
   *F16N 7/34*   (2006.01)
   *B05B 13/02*      (2006.01)
   *B05B 15/04*      (2006.01)
   *B05D 1/04*       (2006.01)
   *B05D 3/02*       (2006.01)
   *B05D 5/08*       (2006.01)

(52) U.S. Cl.
   CPC ............... *B05D 3/0254* (2013.01); *B05D 5/08* (2013.01); *B05D 2258/00* (2013.01)

(56) References Cited

U.S. PATENT DOCUMENTS

| | | | |
|---|---|---|---|
| 3,489,589 A | | 1/1970 | Nissen |
| 3,498,257 A | * | 3/1970 | Lewiecki et al. ............ 118/676 |
| 3,518,110 A | | 6/1970 | Fischbein |
| 3,589,606 A | | 6/1971 | Fish |
| 3,634,122 A | | 1/1972 | Grefe et al. |
| 4,012,551 A | * | 3/1977 | Bogaty et al. ................ 428/192 |
| 5,101,565 A | | 4/1992 | Trankiem |
| 5,263,256 A | | 11/1993 | Trankiem |
| 5,477,756 A | | 12/1995 | Trankiem et al. |
| 5,645,894 A | | 7/1997 | Trankiem |
| 5,985,459 A | | 11/1999 | Kwiecien et al. |
| 6,110,532 A | | 8/2000 | Causton et al. |
| 6,170,760 B1 | | 1/2001 | Bievenue et al. |
| 6,228,428 B1 | | 5/2001 | Trankiem |
| 6,684,513 B1 | | 2/2004 | Clipstone et al. |
| 6,866,894 B2 | | 3/2005 | Trankiem et al. |
| 6,951,668 B2 | | 10/2005 | Guimont et al. |
| 7,247,249 B2 | | 7/2007 | Trankiem |
| 2003/0006322 A1 | * | 1/2003 | Hartle et al. .................. 239/691 |
| 2003/0121158 A1 | * | 7/2003 | Clipstone et al. .......... 30/346.54 |
| 2007/0062047 A1 | | 3/2007 | Zhuk et al. |
| 2007/0124944 A1 | * | 6/2007 | Thoene et al. ............. 30/346.54 |
| 2007/0186424 A1 | | 8/2007 | Becker et al. |
| 2007/0227009 A1 | | 10/2007 | Zhuk et al. |

FOREIGN PATENT DOCUMENTS

| | | |
|---|---|---|
| JP | 2008-302266 A | 12/2008 |
| WO | WO 93/20952 | 10/1993 |

OTHER PUBLICATIONS

Accu Mist-for Single Stent Coating Applications internet citation XP002312401.

The office action issued for the parallel Japan patent application JP 2012-534550.

* cited by examiner

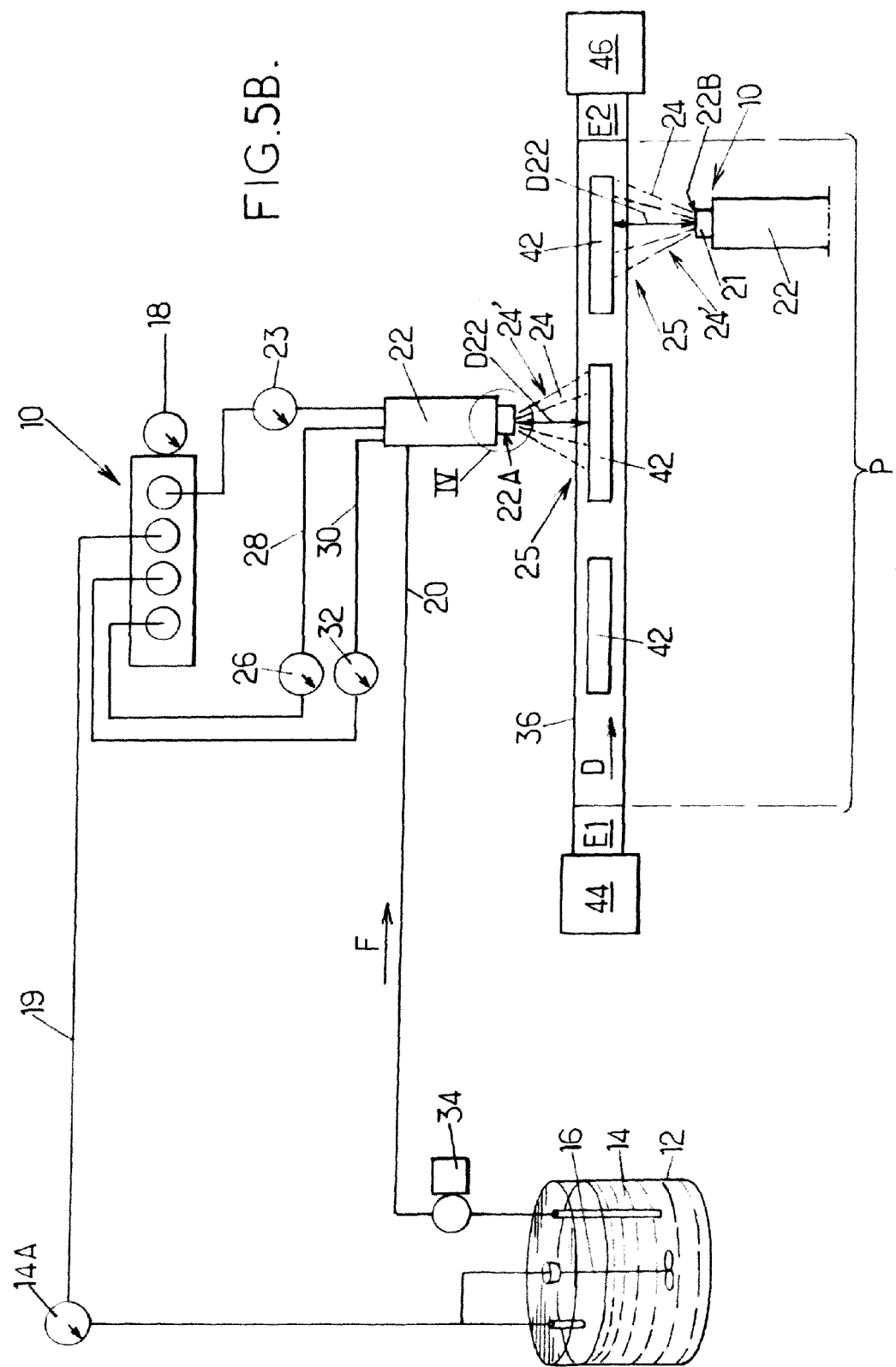

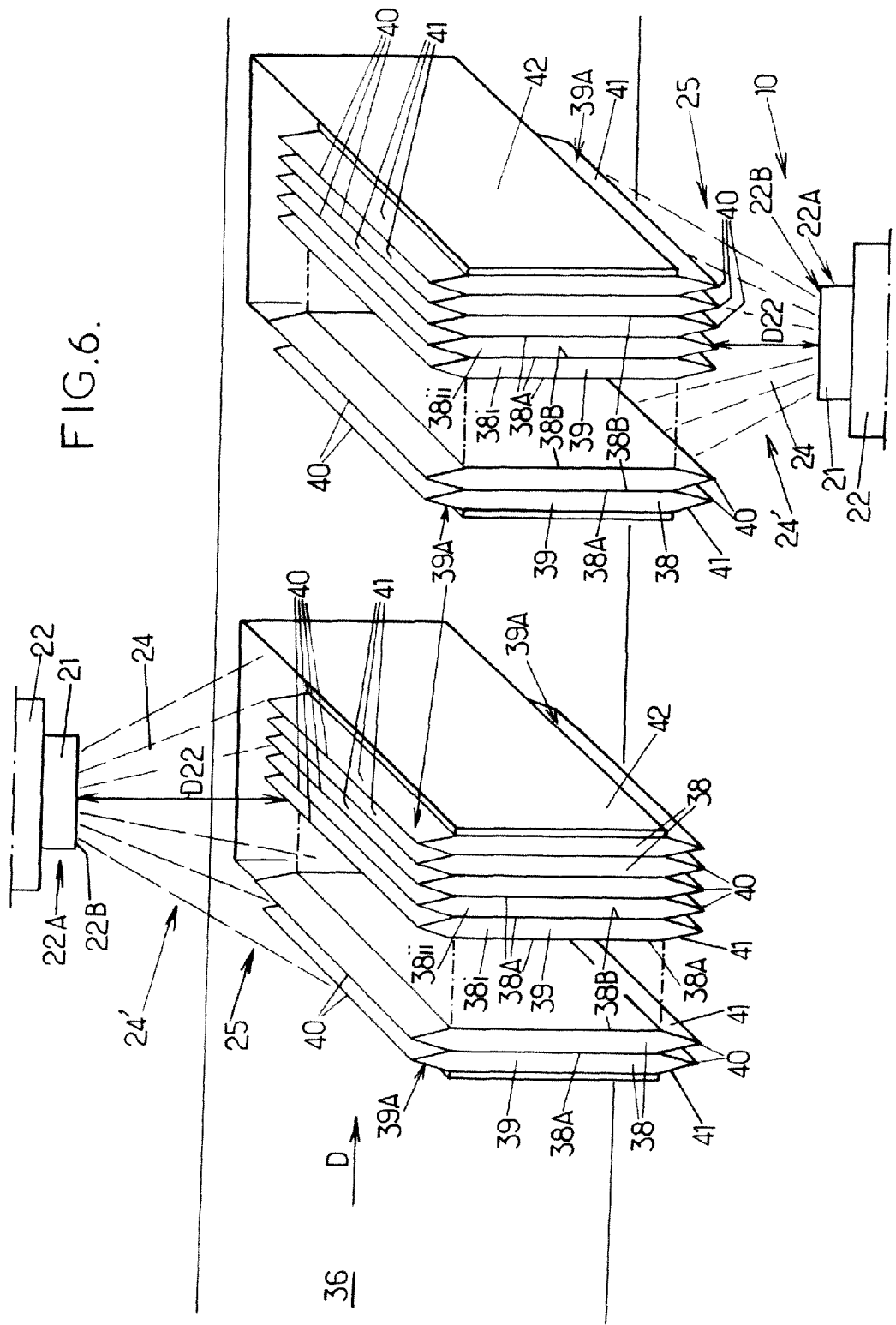

METHOD OF FORMING A LUBRICATING COATING ON A RAZOR BLADE, SUCH A RAZOR BLADE AND RAZOR BLADE COATING SYSTEM

CROSS REFERENCE TO RELATED APPLICATION

This application is a national stage application of International Application No. PCT/EP2009/063936 filed on Oct. 22, 2009, the entire contents of this application are incorporated herein by reference.

The embodiments of the present invention relate to methods and systems of forming a lubricating coating on a razor blade.

BACKGROUND OF THE INVENTION

In particular, the embodiments of the present invention are related to a method of forming a lubricating coating on a razor blade.

Razor blades are very unique cutting tools, which is due to their very unique function, among cutting tools, of cutting hair sticking out from the skin. Such cutting action is quite different from the one of other cutting tools, which led razor blades to be designed with some specific functionalities over time.

For example, it was proposed in FR 1299 519 (U.S. Pat. No. 3,071,856) to deposit a lubricating polymer coating on a razor blade edge. In this document, deposition methods such as sublimation, electrophoresis, spraying or dipping are listed in a general way. Since then, little progress was published regarding lubricating coating deposition methods on razor blades. However, not any deposition method is suitable for the deposition of a coating which would both be an industrially applicable method enabling high throughput and still provide the required properties of such lubricating coating, including at least one of good adhesion to a substrate of complex shape during deposition, good lubricating effect during shaving, good adhesion to the substrate during the life time of the razor blade, and improved shaving comfort.

The invention has an object to mitigate any drawbacks.

SUMMARY OF THE EMBODIMENTS OF THE PRESENT INVENTION

To this aim, it is provided a method of forming a lubricating coating on a razor blade that includes:
(a) providing at least one razor blade having a body and a cutting edge tapering from the body,
(b) providing a tank of an colloidal dispersion of a polymer the dispersion comprising less than 2% in weight of polymer particles,
(c) providing a spray gun in fluid communication with the tank, the spray gun having an end directed to a blade-spraying region,
(d) placing the razor blade at a predetermined temperature in the blade-spraying region,
(e) flowing the colloid dispersion from the tank to the end of the spray gun, and in direction to the razor blade placed in the blade-spraying region,
(f) controlling a first gas stream to nebulize the dispersion into a mist in a dispersion region located between the end of the spray gun and the razor blade,
(g) independently controlling a second gas stream to control the mist properties, independently from step (f),
(h) transporting the mist from the dispersion region to the razor blade placed in the blade-spraying region, the razor blade being at a predetermined temperature so that water evaporates from the mist,
(i) sintering the polymer applied onto the razor blade.

The sintering of the polymer means the heating of the deposited polymeric particles at a specific temperature, higher than the melting temperature, for a specific time to allow the film formation onto the razor blade.

Internal tests performed by the Applicant showed that the razor blades obtained by this method had a satisfactory behavior.

In some embodiments of the present invention, one might also use one or more of the features as defined below:
step (d) includes continuously moving the razor blade along a conveying path from an entry station through the blade-spraying region to an exit station;
step (d) includes continuously moving a stack of razor blades comprising the razor blade along the conveying path along a conveying direction, the body of each of the razor blades having a first and a second parallel side faces extending normal to the conveying direction, the first face of a razor blade facing the second face of a neighbour razor blade;
step (a) comprises providing the razor blade at a temperature between 140° C. and 180° C.;
the razor blade is at a temperature above 130° C. between at least steps (d) to (h);
step (b) comprises providing a tank of an colloidal dispersion of a polymer having a molecular weight of about 45,000 and/or a primary particle size of about 0.2 µm;
step (c) comprises providing the end of spray gun with an air-cap adapted to control nebulisation of the dispersion;
at least one of the following parameters is set in the following range:
pressure of the first gas stream between 0 bar and 6 bars;
pressure of the second gas stream between 0 bar and 6 bars;
distance from air-cap end to cutting edge of the razor blade between 5 cm and 40 cm;
concentration of polymer in dispersion less than 2% in weight;
no electro-static field is applied to the razor blade at least during step (h).

The embodiments of the present invention also concern a razor blade obtained by the process above-mentioned.

The embodiments of the present invention also concern a razor blade coating system comprising:
(A) at least one razor blade having a body and a cutting edge tapering from the body,
(B) a tank of an colloidal dispersion of a polymer, the dispersion comprising less than 2% in weight of polymer particles,
(C) a spray gun in fluid communication with the tank, the spray gun having an end directed to a blade-spraying region,
(D) a temperature setting system adapted to set the temperature of the razor blade so that the razor blade is placed at a predetermined temperature in the blade-spraying region,
(E) a pump adapted to flow the colloid dispersion from the tank to the end of the spray gun, and in direction to the blade,
(F) a first control system adapted to control a first gas stream to nebulize the dispersion into a mist in a dispersion region located between the end of the spray gun and the blade, (G) a second control system, adapted to independently control a second gas stream to form the mist, the mist being thus transported from the dispersion region to the blade, the blade being at a predetermined temperature so that water evaporates from the mist, (H) a sintering station adapted to sinter the applied polymer.

BRIEF DESCRIPTION OF THE DRAWINGS

Other characteristics and advantages of the invention will readily appear from the following description of two of its embodiments, provided as non-limitative examples, and of the accompanying drawings.

On the drawings:

FIG. 5B is a schematic view of a razor blade coating system according to another embodiment, and FIG. 6 is an elevational view of a part of the razor blade coating system of FIG. 1 with double edge razor blades.

On the different Figures, the same reference signs designate like or similar elements.

DESCRIPTION OF PREFERRED EMBODIMENTS OF THE INVENTION

Figure 1:
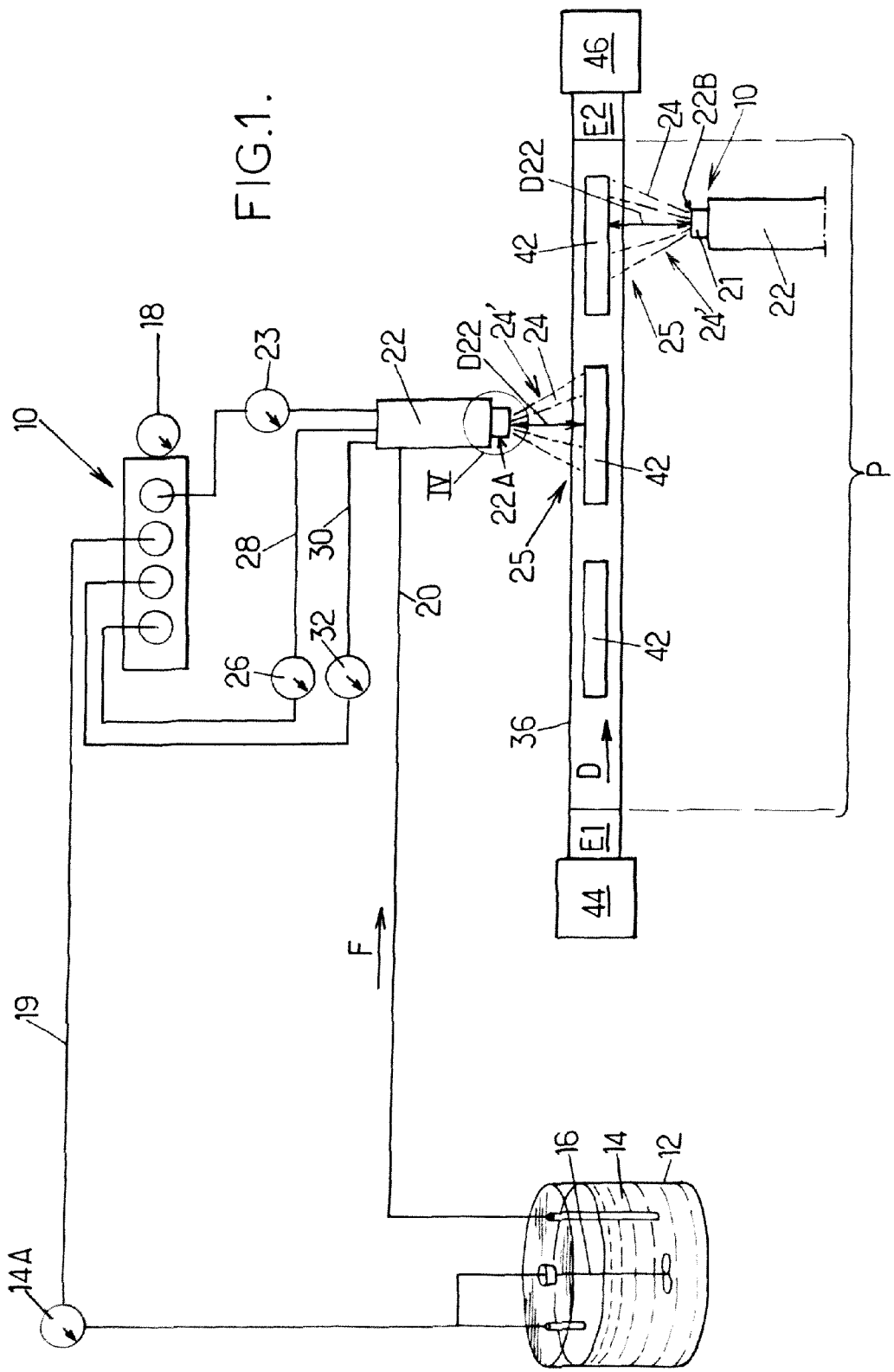
FIG. 1 is a schematic view of a razor blade coating system of an embodiment of the present invention.

As depicted on FIG. 1, the razor blade coating system 10 comprises a tank 12 containing a colloidal dispersion 14 of a polymer.

Since the main goal of the process is to deliver PTFE particles onto the edge of razor blades so as to make possible after a sintering process that follows (detailed hereafter), to create a uniform film of lubricating coating at the edge of the razor blade, the colloidal dispersion 14 comprises a polymer, preferably a polytetrafluoroethylene (PTFE), and comprises less than 2% in weight of polymer particles.

Figure 2:
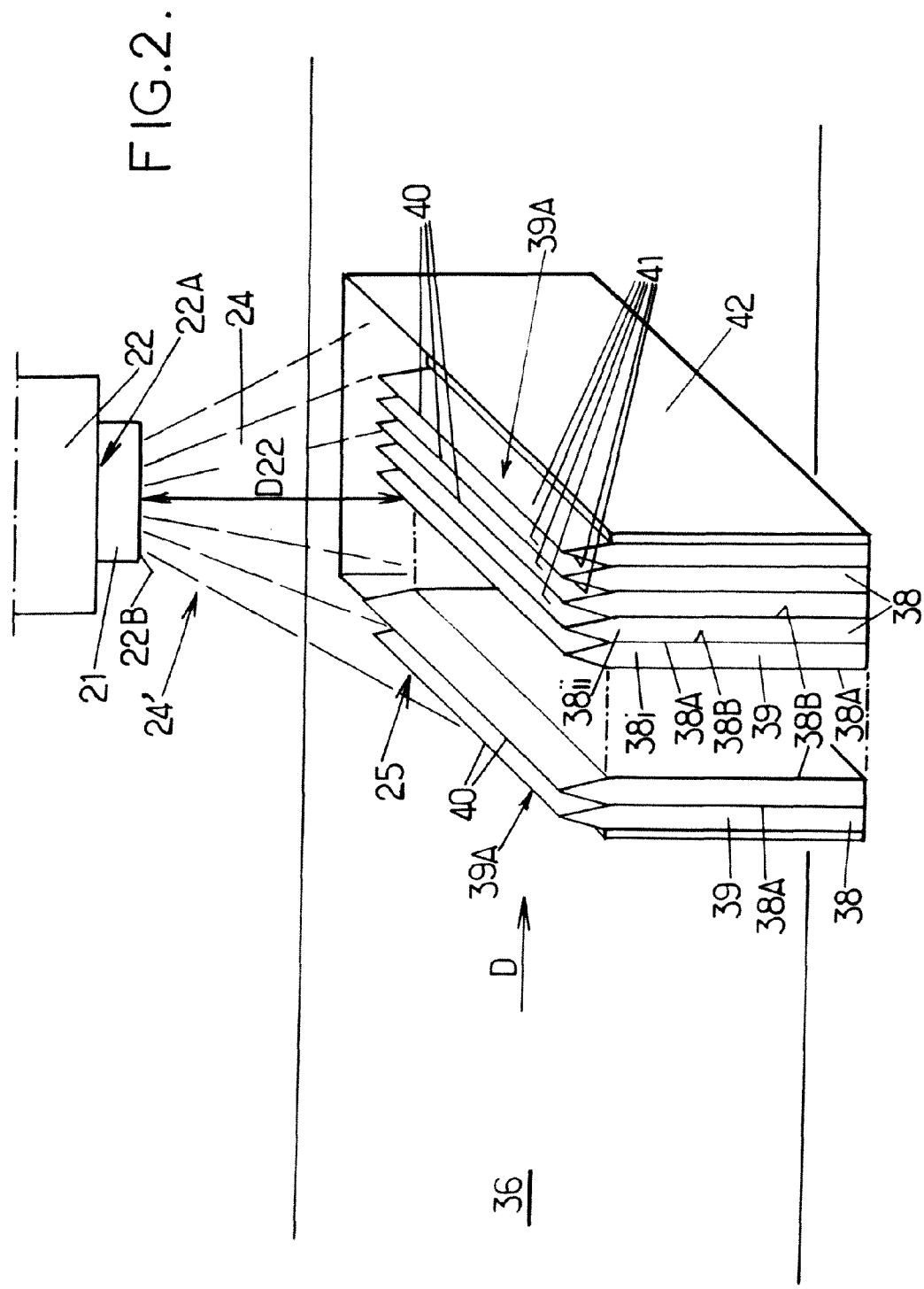
FIG. 2 is an elevational view of a part of the razor blade coating system of FIG. 1 with one edge razor blades.

As better depicted on FIG. 2, the razor blades 38 have a body 39 and a cutting edge 39A tapering from the body and the razor blade coating system 10 allows the coating of the cutting edge 39A. More precisely, the coating system 10 allows the coating of the two tapered sides 41 and their connected tip 40 (cutting free end of the cutting edge 39A) forming each cutting edge 39A.

As an example, the colloidal dispersion 14 can be obtained from a product named Krytox® LW 1200, which has been known since 1999 and comprises about 20% in weight of a polymer having a molecular weight of about 45,000 and/or a primary particle size of about 0.2 μm, more precisely inferior to 0.2 μm. The colloidal dispersion is further diluted by using de-ionized water to a final concentration of polymer of less than 2% in weight.

Figure 3:
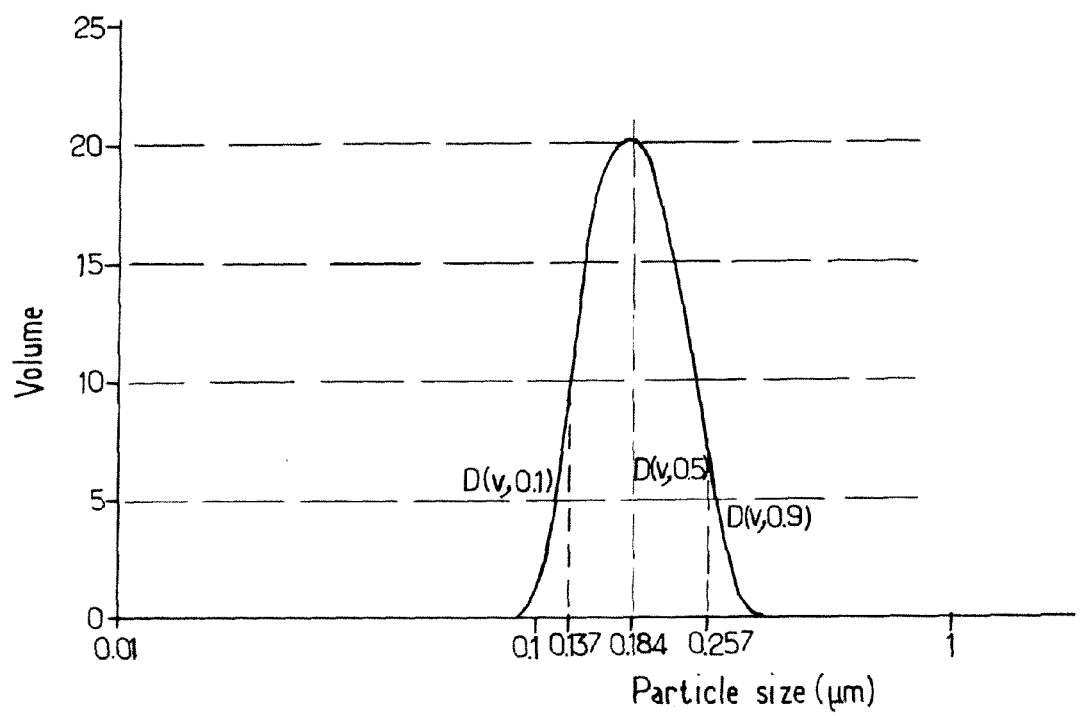
FIG. 3 is a diagram of the particles size dispersion of the colloidal dispersion.

As depicted on the FIG. 3 illustrating the particle size distribution in the colloidal dispersion 14, the diameter of the particle is greater than 0.1 μm. Value D (v, 0.5), corresponding to the median of the diameter distribution (50% of the particles are less or equal to that size), is equal to 0.184 μm. Besides, as indicated on value D (v, 0.1), 10% of the particles have a diameter which is less or equal to 0.137 μm, whereas as indicated on value D (v, 0.9), 90% of the particles have a diameter which is less or equal to 0.257 μm.

Thanks to a stirrer 16 provided in the tank 12, the colloidal dispersion 14 is preferably under constant mild stirring in order to have a homogeneous repartition of the dispersion.

The tank 12 is connected to an air supply 18 connected to a pump, via a pipe 19 to create in the tank 12 a pressurization such that the colloidal dispersion 14 thus pressurized flows in a pipe 20 connected to the tank 12. The colloidal dispersion 14 is preferably pressurized with a low flow F, for example with a flow F comprised between 2 MPa and 20 MPa. An air pressure control 14A can be provided on the pipe 19 in order to control the air pressure delivered in the tank 12 and adjust the flow of colloidal dispersion 14 in the pipe 20.

Besides, a spray gun 22 is in fluid communication with the tank 12; more specifically, the pipe 20 is connected at one end to the tank 12 and on the other end to the spray gun 22. The spray gun 22 is preferably a "low pressure spray gun" and uses air pressure and fluid pressure to achieve as detailed hereafter atomization of the coating. The spray gun 22 has an end 22B directed to a blade-spraying region 25.

Figure 4:
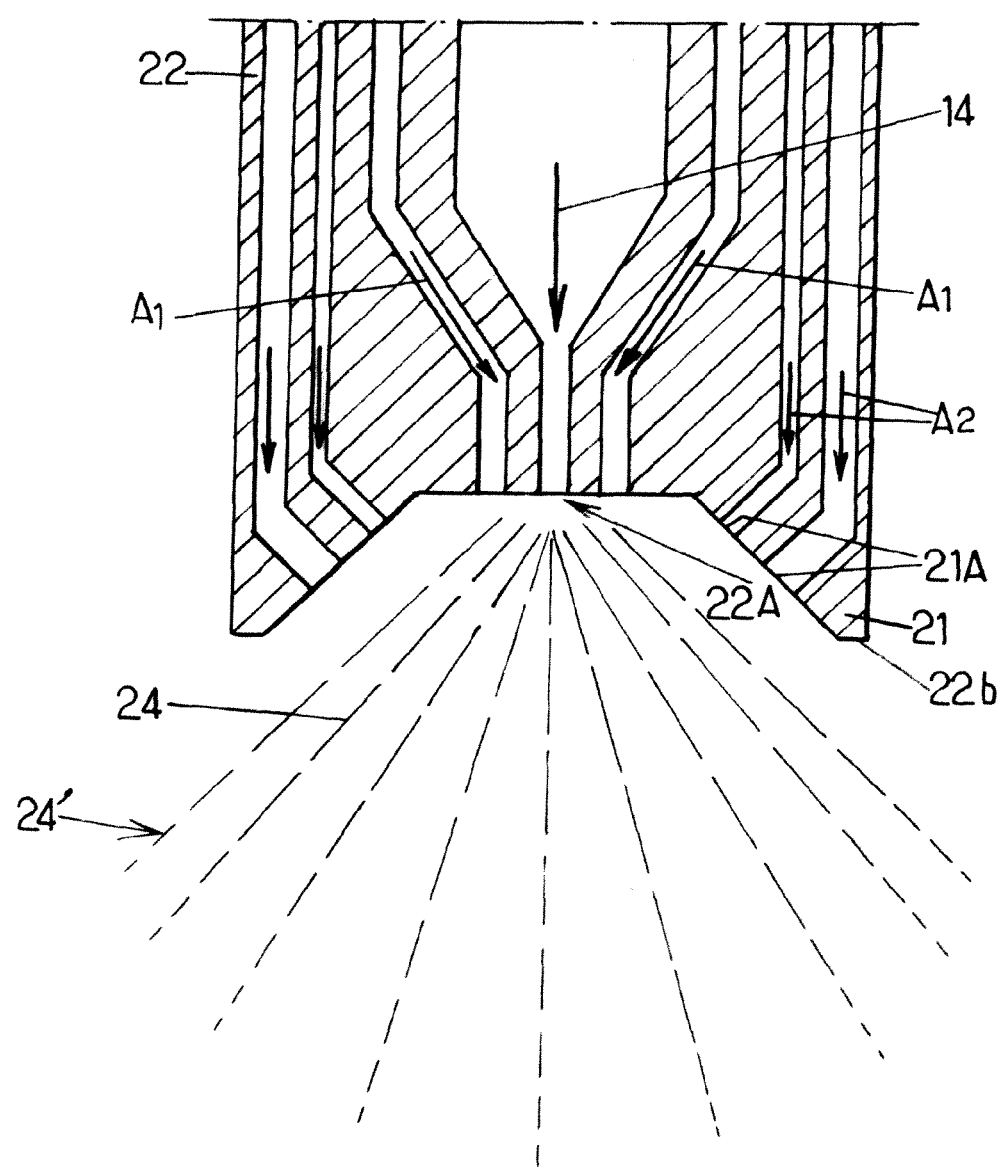
FIG. 4 is a detail IV of the razor blade coating system of FIG. 1.

As depicted on FIG. 1 and best seen on the detail of FIG. 4, a first gas stream, more specifically an atomization air A1 is created to nebulize, on a fluid exit 22A provided on the spray gun 22, the pressurized dispersion 14. In other words, the pressurized dispersion 14 is reduced to extremely fine particles located in a kind of mist 24. This mist 24 extends from the fluid exit 22A in a dispersion region 24 located between the end of the spray gun 22B and the razor blade 38 located in the blade-spraying region 25.

The atomization air A1 can be created by a separate air pump or with the same air supply 18 connected to the spray gun 22 by a pipe 28. For example, the pressure of the atomization air A1 is less than 6 bars (included) and preferably comprised between 0.5 bar and 3.0 bars.

A first control system comprising an air control 26 provided on the pipe 28 is adapted to control the atomization air A1 circulating in the pipe 28 and thus the nebulisation process, more specifically the atomization process.

As depicted in FIG. 1, the air control 26 is connected between the spray gun 22 and the air supply 18. The first control system further comprises an air-cap 21 provided on the spray gun 22 as best seen on FIG. 4. According to the air-cap 21 chosen, the nebulisation process will have different properties (size and repartition of the particles in the mist, etc.).

A second gas stream A2 circulating through the air-cap 21 is further created to control the mist 24 properties. More specifically, according to the shape and/or holes 21A provided on the air-cap 21, at least the shape and repartition of the atomized material (fine particles obtained after atomization of the pressurized dispersion 14 with the atomization air A1) are different in the mist 24.

Here again, the second gas stream A2 can be created by a separate air pump or with the same air supply 18 connected to the spray gun 22 by a pipe 30. For example, the pressure of the second gas stream is less than 6 bars (included) and preferably comprised between 0.2 bar and 1.5 bars.

Besides, a second control system 32, adapted to independently control the second gas stream A2 is provided on the pipe 30.

The shape of the spraying pattern is also controlled by this dedicated second gas stream A2 in combination with the holes 21A provided on the air-cap 21.

Therefore, even if the same air supply 18 is used, the pattern shape and the atomization have dedicated air-supplies with separate pressure controllers and the quality of the spraying is able to be controlled in regulating the pressure of the air supply with each control system. According to the material to be coated, the operator fixes the air pressure at each controller and the pressure in the tank 12 initializes the spraying by opening the spray gun 22. A gun trigger 23 can further be provided in order to control the spray gun 22.

The mist 24 is thus transported from the dispersion region 24' to the blade-spraying region 25, the razor blade being at a predetermined temperature as detailed hereafter so that the water initially contained in the colloidal solution evaporates from the mist 24. To guarantee the covering of the edge of the razor blades, the distance D22 between the air-cap end 22B, corresponding to the end of the spray gun 22, to the cutting edge 39A of the razor blades 38, depends on the tip and air cap chosen. For instance, the distance D22 can be comprised between 5 cm and 40 cm. More precisely, the distance D22 is better comprised between 17 cm and 22 cm from the air-cap end 22B to the tip 40 of the razor blades 38.

Figure 5A:
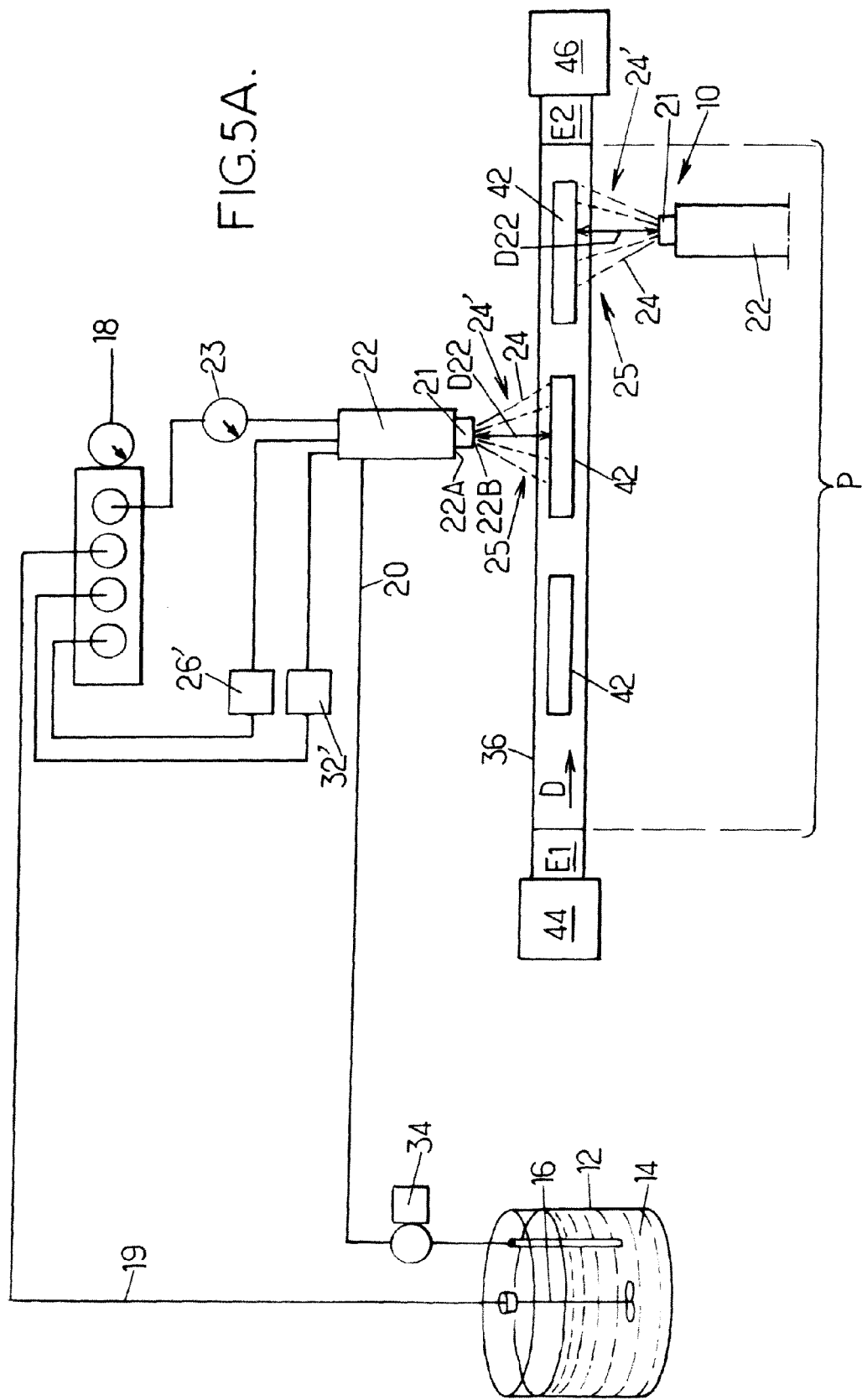
FIG. 5A is a schematic view of a razor blade coating system according to another embodiment.

The first 26 and second control system 32 can be common air controllers (analogical) or, in order to improve the control of the spraying process, digital high accuracy controllers 26' and 32'. Besides, in replacement of the pump and air pressure control 14A, a gear pump 34 can also be connected onto the pipe 20 in order to improve the control of the flow of the pressurized colloidal dispersion 14, as depicted on FIG. 5A. Such a gear pump 34 connected onto the pipe 20 can also be provided in complement to the pump and air pressure control 14A as depicted on FIG. 5B, to improve the consistency reliability of the flow during the spraying sessions.

To improve the deposition of the pressurized colloidal dispersion 14 on the razor blades, one or several suction points can be provided along the conveying path P, especially on the other side of the conveyor 36 in front of the gun 22.

In order to avoid PTFE accumulation in the razor blade coating system 10, a cleaning process of the pipe system can be held. To this extend, the colloidal dispersion 14 is replaced by pure isopropyl alcohol and the same steps of spraying are made. This is necessary in order to avoid PTFE accumulation in the system in between spraying sessions. In the spraying mode the operator fixes the air pressure at each controller and the pressure in the tank 12 and initializes the spraying by opening the spray gun 22 with the gun trigger 23. A separate system with a second tank containing the isopropyl alcohol can also be provided.

The razor blade coating system 10 further comprises a conveyor 36 for continuously moving the razor blades 38 along a conveying path P from an entry station E1 through the blade-spraying region 25 to an exit station E2.

In reference to FIGS. 1, 2, 5 and 6, the razor blades 38 can be placed on a stack 42 moving along the conveying path P along a conveying direction D, the body 39 of each razor blades 38 having a first side face 38A and a second parallel side face 38B extending normal to the conveying direction, the first face 38A of a razor blade 38*i* facing the second face 38B of a neighbour razor blade 38*ii*.

When arriving in front of the spray gun 22, the cutting edge 39A, more precisely each of the two tapered sides 41 connecting the tip 40 to the body 38 of one blade are coated substantially simultaneous. The same appears with all the blades contained in one stack.

When the blades 38 are double edge blades as depicted on FIG. 6, a second razor blade coating system 10 can be provided in order to coat the two sides of each blade along the conveying path P. In this case, the second 22 spray gun is placed on the other side of the conveyor. The second spray gun can be placed directly opposite the first one or it can be staggered with the first one.

In order to make possible the evaporation of the water and the delivery of the PTFE particles onto the razor blades 38 after spaying, the razor blades 38 are preheated prior their entry in the entry station E1. Therefore, a temperature setting system is adapted to set the temperature of the razor blade so that the razor blade is placed at a predetermined temperature in the blade-spraying region. More precisely, the temperature setting system comprises a heating means 44 which is preferably provided nearby the entry station E1 in order to keep the razor blades 38 heated after their exit from the heating means 44 and along the conveying path P, especially in the blade-spraying region 25. In order to avoid oxidation of the razor blades when heated, the heating can also occur under a reducing gas, for example under nitrogen.

To guarantee the evaporation of the water contained in the mist 24, the razor blades 38 are preferably at a temperature comprised between 140° C. and 180° C. at the entry station E1, such that the razor blades are at a temperature above 130° C. along the conveying path P. More precisely, the razor blades are at a predetermined temperature T comprised between 145° C. and 150° C. in the blade-spraying region 25. Therefore, according to the speed of the conveyor 36, the razor blades 38 are preferably preheated between 130° C. and 180° C., more precisely between 160° C. and 165° C.

After having being coated with the PTFE comprised in the mist 24, the razor blades are further conveyed to a sintering station 46 adapted to sinter the applied polymer. The sintering station is preferably a linear heating oven 46 allowing the sintering of the PTFE. The sintering of the PTFE particles onto the razor blades 38 is the final step of the method of the invention. The temperature profile has been customized in order to both sinter properly the PTFE and to arrive to the best performance in shaving. This sintering step is preferably performed under a nitrogen atmosphere to avoid any corrosive phenomena.

After the spray occurs, the stacks 42 are placed on a conveyor which feeds with a constant speed. The stacks 42 are heated up and are finally collected at the exit of the oven 46. While the preheating and the spraying steps are continuous, the sintering step is not. In fact, a short time between spraying and sintering can be devoted to the cooling down of the stacks 42 after the spraying, but the sintering can also occur continuously with the spraying. In this last case, a temperature profile has to be performed during preheating, heating and sintering to obtain good results, especially when the dimensions of the blades vary one series to another.

Besides, the temperature profile measured on the razor blades 38 can vary due to the difference of the blade weight. Since, the PTFE typically melts at about 325° C., therefore the razor blades are heated above 325° C., for instance at about 365° C.

During each step and especially during the transporting of the mist from the dispersion region 24' to the razor blade 38 placed in the blade-spraying region 25, no electro-static field is applied to the razor blade 38.

With such a razor blade coating system 10 as above-described, the method of forming a lubricating coating on a razor blade according to an embodiment of the present invention comprises the following steps:

placing razor blades 38 in stacks 42, the first face 38A of a razor blade 38*i* facing the second face 38B of a neighbour razor blade 38*ii* and preheating them at a temperature between 140° C. and 180° C. in the heating means 44, continuously moving the stacks 42 along the conveying path P along the conveying direction D from the entry station E1 through the blade-spraying region 25 to an exit station E2, such when the stacks 42 arrive in the blade-spraying region 25, the razor blades are at the predetermined temperature T above 130° C., flowing the dispersion 14 from the tank 12 to the end 22B of the spray gun 22, and in direction to the razor blade 38 placed in the blade-spraying region 25, controlling the first gas stream to a pressure between 0 bar and 6 bars, to nebulise the dispersion 14 into a mist 24 in a dispersion region 24' located between the end 22B of the spray gun 22 and the razor blade 38, controlling independently the second gas stream to a pressure between 0 bar and 6 bars, to form the mist 24, eventually adapting the air-cap 21 to control nebulisation of the dispersion 14, eventually adapting the distance D22 from the air-cap end 22B to cutting edge 40 of the razor blade 28 between 5 cm and 40 cm, transporting the mist 24 from the dispersion region 24' to the razor blade 38 placed in the blade-spraying region 25, the razor blade 38 being at the predetermined temperature T of about 130° C. so that the almost all the water contained initially in the colloidal dispersion 14 evaporates from the mist 24 when the last comes in contact with the hot razor blade 38, and melting, more precisely sintering, the polymer applied onto the razor blade 38.

After these successive steps of preheating, spraying and heating again, the razor blade 38 obtained is provided with a lubricating coating on its cutting edge 39 (comprising both tapered sides 41 and the tip 40).

The invention claimed is:

1. A method of forming a lubricating coating on a razor blade comprising:

(a) providing at least one razor blade having a body and a cutting edge tapering from the body, (b) providing a tank of a colloidal dispersion of a polymer of polytetrafluoroethylene (PTFE) diluted in water, the colloidal dispersion comprising less than 2% in weight of polymer particles and the polymer having a primary particle size of greater than 0.1 micrometers and a molecular weight of about 45,000, (c) providing a spray gun in fluid communication with the tank, the spray gun having an end directed to a blade-spraying region, (d) placing the razor blade at a predetermined temperature (T) in the blade-spraying region, (e) flowing the colloidal dispersion from the tank to the end of the spray gun, and in direction to the razor blade placed in the blade-spraying region, (f) controlling a first gas stream to nebulise the colloidal dispersion into a mist in a dispersion region located between the end of the spray gun and the razor blade with a first control system provided on a pipe connecting the spray gun and an air supply, (g) independently controlling a second gas stream to control the mist properties, independent from step (f), with a second control system provided on a pipe connecting the spray gun with an air supply, the first control system and the second control system being adapted to control independently the pressure of the first gas stream and of the second gas stream respectively, (h) transporting the mist from the dispersion region to the razor blade placed in the blade-spraying region, the razor blade being at the predetermined temperature so that water evaporates from the mist, and (f) sintering the polymer applied on the razor blade.

2. The method according to claim 1, wherein step (d) includes continuously moving the razor blade along a conveying path from an entry station through the blade-spraying region to an exit station.

3. The method according to claim 2, wherein step (d) includes continuously moving a stack of razor blades along the conveying path in a conveying direction, the body of each of the razor blades having first and second parallel side faces extending normal to the conveying direction, the first face of a razor blade facing the second face of a neighbor razor blade.

4. The method according to claim 1, wherein step (a) comprises providing the razor blade at a temperature between 140° C. and 180° C.

5. The method according to claim 1, in which the razor blade is at a temperature above 130° C. between at least steps (d) to (h).

6. The method according to claim 1, wherein step (c) comprises providing the end of the spray gun with an air-cap adapted to control nebulization of the colloidal dispersion.

7. The method according to claim 1, wherein at least one of the following parameters is set in the following range:

pressure of the first gas stream between 0 bar and 6 bars;

pressure of the second gas stream between 0 bar and 6 bars; and distance from the spray gun end to cutting edge of the razor blade between 5 cm and 40 cm.

8. The method according to claim 1, wherein no electrostatic field is applied to the razor blade at least during step (h).

9. The method according to claim 3, wherein step (a) comprises providing the razor blades at a temperature between 140° C. and 180° C.

10. The method according to claim 3, in which the razor blades are at a temperature above 130° C. between at least steps (d) to (h).

11. The method according to claim 4, in which the razor blade is at a temperature above 130° C. between at least steps (d) to (h).

12. The method according to claim 3, wherein step (c) comprises providing the end of the spray gun with an air-cap adapted to control nebulization of the colloidal dispersion.

13. The method according to claim 4, wherein step (c) comprises providing the end of the spray gun with an air-cap adapted to control nebulization of the colloidal dispersion.

14. The method according to claim 3, wherein at least one of the following parameters is set in the following range:

pressure of the first gas stream between 0 bar and 6 bars;

pressure of the second gas stream between 0 bar and 6 bars; and distance from the spray gun end to cutting edge of the razor blade between 5 cm and 40 cm.

15. The method according to claim 4, wherein at least one of the following parameters is set in the following range:

pressure of the first gas stream between 0 bar and 6 bars;

pressure of the second gas stream between 0 bar and 6 bars; and distance from the spray gun end to cutting edge of the razor blade between 5 cm and 40 cm.

16. A razor blade having a lubricating coating obtained by a method comprising:

(a) providing at least one razor blade having a body and a cutting edge tapering from the body, (b) providing a tank of a colloidal dispersion of a polymer of polytetrafluoroethylene (PTFE) diluted in water, the colloidal dispersion comprising less than 2% in weight of polymer particles and the polymer having a primary particle size of greater than 0.1 micrometers and a molecular weight of about 45,000, (c) providing a spray gun in fluid communication with the tank, the spray gun having an end directed to a blade-spraying region,
(d) placing the razor blade at a predetermined temperature (T) in the blade-spraying region,
(e) flowing the colloidal dispersion from the tank to the end of the spray gun, and in direction to the razor blade placed in the blade-spraying region,
(f) controlling a first gas stream to nebulise the colloidal dispersion into a mist in a dispersion region located between the end of the spray gun and the razor blade with a first control system provided on a pipe connecting the spray gun and an air supply,
(g) independently controlling a second gas stream to control the mist properties, independent from step (f), with a second control system provided on a pipe connecting the spray gun with an air supply, the first control system and the second control system being adapted to control independently the pressure of the first gas stream and of the second gas stream respectively,
(h) transporting the mist from the dispersion region to the razor blade placed in the blade-spraying region, the razor blade being at the predetermined temperature so that water evaporates from the mist, and
(f) sintering the polymer applied on the razor blade.

17. A razor blade coating system comprising:
(A) at least one razor blade having a body and a cutting edge tapering from the body,
(B) a tank of a colloidal dispersion of a polymer polytetrafluoroethylene (PTFE) diluted in water, the colloidal dispersion comprising less than 2% in weight of polymer particles and the polymer having a primary particle size of greater than 0.1 micrometers and a molecular weight of about 45,000,
(C) a spray gun in fluid communication with the tank, the spray gun having an end directed to a blade-spraying region,
(D) a temperature setting system adapted to set the temperature of the razor blade so that the razor blade is placed at a predetermined temperature in the blade-spraying region,
(E) an air supply adapted to flow the colloidal dispersion from the tank to the end of the spray gun, and in direction to the razor blade,
(F) a first control system provided on a pipe connecting the spray gun and an air supply adapted to control the pressure of a first gas stream to nebulise the colloidal dispersion into a mist in a dispersion region located between the end of the spray gun and the razor blade,
(G) a second control system provided on a pipe connecting the spray gun with an air supply adapted to independently control the pressure of a second gas stream to form the mist, the mist being thus transported from the dispersion region to the blade-spraying region, the razor blade being at a predetermined temperature so that water evaporates from the mist, and
(H) a sintering station adapted to sinter the applied polymer.

* * * * *